Nov. 10, 1931.  A. T. KASLEY  1,830,839
FUEL OIL DISTRIBUTOR
Filed Jan. 22, 1927
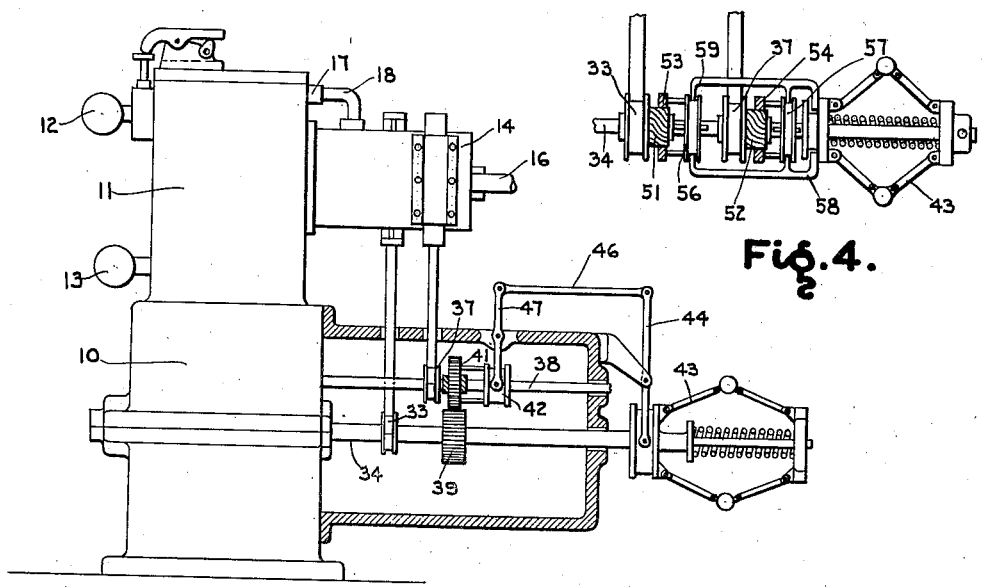
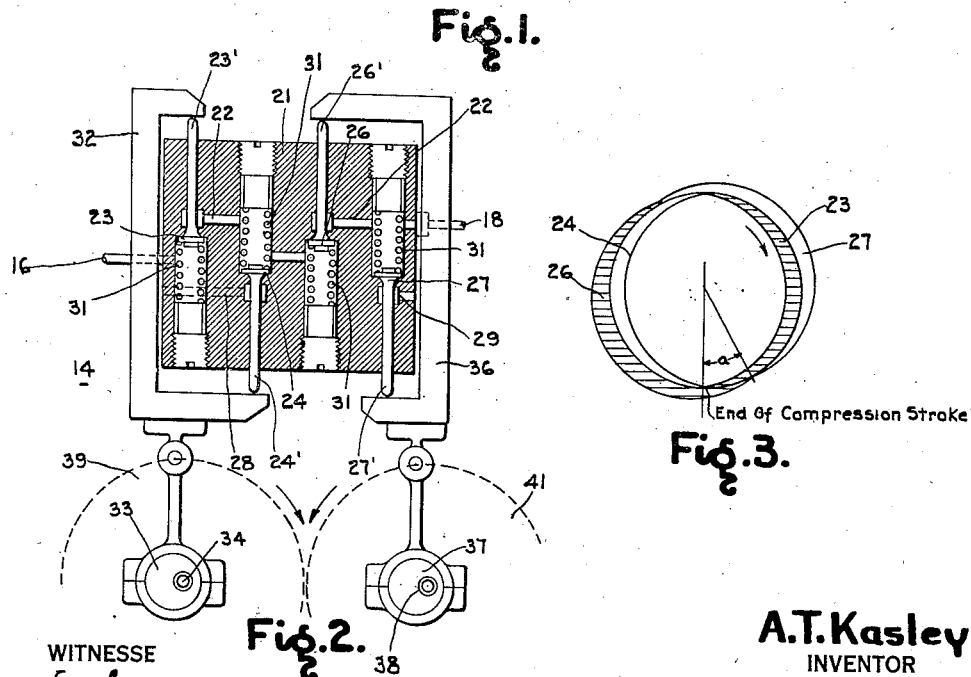
WITNESSE
E. Lutz
A.T. Kasley
INVENTOR
BY A. B. Reavis
ATTORNEY

UNITED STATES PATENT OFFICE

ALEXANDER T. KASLEY, OF MOORES, PENNSYLVANIA, ASSIGNOR TO WESTINGHOUSE ELECTRIC & MANUFACTURING COMPANY, A CORPORATION OF PENNSYLVANIA

FUEL OIL DISTRIBUTOR

Application filed January 22, 1927. Serial No. 162,795.

My invention relates to fuel distributing devices for internal combustion engines and has for its object the provision of apparatus of the character designated which shall be of simple design and easy of manufacture and which shall effect an economical distribution of liquid fuel under a wide range of operating conditions.

Apparatus embodying features of my invention is illustrated in the accompanying drawings forming a part of this application, wherein;

Fig. 1 is a view in elevation of an internal combustion engine having my improved apparatus applied thereto;

Fig. 2 is a sectional view of the distributor somewhat diagrammatic in character, and showing the ports and passages as being approximately in the same plane for the purposes of clearer illustration;

Fig. 3 is a diagrammatic view illustrating the injection period accomplished by means of my improved apparatus; and, Fig. 4 is a detail view showing a modified means of controlling the injection period with my improved apparatus.

Briefly, my invention comprises a housing having passages communicating with a source of fluid under pressure and with the engine cylinder, the pressure of the liquid fuel being sufficiently high for injection purposes. Located within the housing and controlling the flow of fluid through the passages to the engine are a plurality of valves in series. Communicating with the passages are a suitable number of by-pass passages which connect with certain of the valves so that when these valves are open liquid fuel under pressure is by-passed away from the passages and from the engine. Included in the apparatus is a primary controlling valve and a primary by-pass valve which may be driven from the engine in fixed relation to the engine stroke or may be under governor control, if desired. The primary controlling valve is open for about 180° of the engine cycle closing near the ending of the compression stroke of the engine whereupon the primary by-pass valve is opened and remains open throughout the remainder of the cycle of the engine. A secondary controlling valve is also driven from the engine in such a way as to be open for about 180° of the cycle of the engine, whereupon a secondary by-pass valve is opened permitting the liquid fuel in the passage to be diverted away therefrom and from the engine. The time of opening and closing of the secondary controlling and by-pass valves may be varied with respect to the time of the opening of the primary controlling and by-pass valves in accordance with the speed of the engine so as to cause the fuel injection to vary and accommodate a varying load on the engine. The injection period of the apparatus occurs at the time when the two controlling valves are open and the two by-pass valves are closed. The arrangement is preferably such that the direction of movement of the two controlling valves is opposed, that is, when one is opening the other is closing, and the period of injection may thus be very closely regulated.

Referring now to the drawings for a better understanding of my invention, I show, in Fig. 1, an internal combustion engine 10 having a cylinder 11 and provided with scavenging apparatus 12 and an exhaust manifold 13. While the engine illustrated is of the two-cycle type, it will be apparent that the invention is also applicable to other types of engines. The engine 10 is supplied with liquid fuel under pressure by means of my improved distributing apparatus 14. The distributing apparatus 14 may be supplied with liquid fuel under pressure from a conduit 16 connected to any suitable source of liquid fuel under sufficient pressure for injection purposes and delivers the liquid fuel through a conduit 18 to an injection device 17 associated with the engine cylinder.

Referring now more particularly to Fig. 2, it will be seen that the distributing device comprises a housing 21 having an irregular passage 22 in communication with the conduit 18 and the conduit 16. The passage 22 is controlled by a primary controlling valve 23, a primary by-pass valve 24, a secondary controlling valve 26 and a secondary by-pass valve 27.

The primary by-pass valve 24 is effective for by-passing liquid fuel from the passage through a by-pass passage 28 (shown in dotted lines) and the secondary by-pass valve 27 is effective for by-passing liquid fuel from the passage 22 through a passage 29.

The valves illustrated in Fig. 2 are of the poppet type and each is biased toward its seat by means of a spring 31 and is arranged to open against pressure so as to insure tightness. The valves 23, 24, 26 and 27 are provided with stems 23', 24', 26' and 27', respectively. The stems 23' and 26' extend above the housing 21 and the stems 24' and 27' extend below the housing.

The valves 23 and 24 are operated by means of a yoke 32 driven by an eccentric 33 (see Fig. 1) which may be directly connected to the engine crank shaft 34. The setting of the eccentric 33 is such that the yoke 32 bears on the valve stem 23' and holds the valve 23 open during most or all of the compression stroke of the engine and allows the valve to close near the ending of the compression stroke. As the valve 23 is seated by movement of the eccentric 33 the yoke 32 immediately engages the stem 24' and unseats the primary by-pass valve 24, immediately reducing the pressure in the passage 22 beyond the valve 23.

The secondary controlling valve 26 and the secondary by-pass valve 27 are operated by means of a yoke 36 driven by an eccentric 37 so that each of these valves is open for approximately half of the engine cycle in a manner similar to the operation of the primary valves 23 and 24. The eccentric 37 is mounted on a counter shaft 38 driven from the shaft 34 through gearing 39 and 41. It will be noted that the gearing is such that the shaft 38 rotates in a direction opposite to that of the shaft 34 so that the relation of the opening and closing of the secondary valves to the primary valves is opposed.

The timing of the opening and closing of the secondary valves 26 and 27 to the primary valves 23 and 24 is accomplished in the following manner. The gear 41 is threaded on to the shaft 38 so that it may turn with respect to the shaft. Secured to the gear 39 is a collar 42 shiftable along the shaft 34 and controlled by a speed responsive governor 43 through a lever 44, a link 46 and a second lever 47. The gear 39 is made wider than the gear 41 so that the latter may be moved axially thereof; and, due to the threaded relation of the gear 41 with respect to the shaft 38, it causes the gear 41 to take up a relatively different angular position and thus affects the operation of the secondary valves.

From the foregoing description, it will be seen that when either of the by-pass valves 24 or 27 is open there can be no injection of fuel into the engine. It can furthermore be seen that with either of the controlling valves 23 or 26 closed there can be no injection of fuel into the engine. The only time when injection can take place is when both of the valves 23 and 26 are open and when both of the valves 24 and 27 are closed. In order to accomplish the best results, I set the eccentrics 33 and 37 so that at the no load governor position the valve 23 closes just before the valve 26 opens. As the load increases the injection period grows longer due to the action of the speed governor 43 in shifting the gear 41 along the shaft 38 and varying the rotational position of the eccentric 37 with respect to the gear 39 and eccentric 33.

The injection period of the engine under average conditions is illustrated graphically in Fig. 3 wherein the period of opening of the valve 23 is indicated as a darkened segment ending at the end of the compression stroke of the engine when the valve closes. The primary by-pass valve 24 then opens, shown as a blank segment, and closes at the termination of the power stroke of the engine. The direction of movement of the valve 23 from the end of the power stroke to the end of the compression stroke is indicated by the arrow. The opening of the secondary controlling valve 26 is indicated by a shaded segment, and the opening of the secondary by-pass valve 27 is indicated by a blank segment.

As will be seen from the drawings, the secondary controlling valve 26 is beginning to open at a point prescribed by the angle (a) in advance of the closing of the primary controlling valve 23, so that there is a period of the stroke, prescribed by the angle (a) wherein the two valves are opened simultaneously. As the load on the engine increases the relation of the controlling eccentrics is changed by the governor 43 so that the angle (a) may be increased, giving a longer period of injection and a period wherein the valves 23 and 26 are wide open in relation to each other, permitting a greater quantity of liquid fuel to pass to the engine.

It is to be understood that I do not limit myself to the adjustments mentioned above. The governor control can apply to either the primary or the secondary valve or both. Either the primary or the secondary valve can be made to determine the time of beginning the injection, the other then determining the end.

For example, I show in Fig. 4 a modified form of my invention where both the primary and secondary controlling valves are under governor control. In this view, like parts are designated by the same numerals used in Figs. 1 and 2 and a description thereof will not be repeated. In accordance with this modification, both the eccentrics 33 and 37 are mounted on the shaft 34 so as to be adjustably rotatable with respect thereto. Connected to the eccentric 33 is a spiral gear 51 and connected to the eccentric 37 is a spiral gear 52. The gears 51 and 52 mesh with internal gears 53 and 54, respectively, connected to collars 56 and 57, respectively. The collars 56 and 57 are mounted on the shaft 34 with a key connection so as to be longitudinally slidable with respect to the shaft. They retain the eccentrics 33 and 37, through their associated gears, in fixed angular position with respect to the shaft except at such times as the collars are moved axially. Both collars 56 and 57 are under the control of the governor 43 through the intermediary of a pair of yoke members 58 and 59. As the governor assumes different positions due to variations in speed, the yoke members 58 and 59 move the collars 56 and 57 on the shaft 34 and change the relative positions of the eccentrics 33 and 37 with respect to the shaft by means of the inclination of the teeth of the gears 51 and 52.

With the form of apparatus just described, it will be seen that both of the primary and secondary valves are under governor control. This form of apparatus may be preferable where especially close regulation is desired.

From the foregoing, it will be apparent that I have devised an improved fuel distribution apparatus for internal combustion engines which is effective to supply fuel to the engine in closely regulated quantities and by means of which extremely close regulation of the engine may be effected.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

I claim:

1. In a distributor for supplying liquid fuel under pressure to an internal combustion engine, the combination with a source of liquid fuel under pressure, of means defining a passage for the fuel from the source to the engine, first and second valve means located in the passage in series relationship for controlling, respectively, the cut-off and admission of fuel to the engine, additional valve means associated with the first and second fuel valve means for by-passing fuel away from the passage, means for operating both said first and second fuel valve means as well as said by-pass valve means in timed relationship with respect to the engine and with respect to each other, and means for changing the timed relationship of the first and second fuel valve means in relation to each other, whereby the duration of the fuel injection period may be varied.

2. In a distributor for supplying liquid fuel under pressure to an internal combustion engine, the combination with a source of liquid fuel under pressure, of means defining a passage for the fuel from the source to the engine, first and second valve means located in the passage in series relationship for controlling, respectively, the cut-off and admission of fuel to the engine, a valve associated with one of the fuel valves for by-passing fuel away from the passage, means for actuating said by-pass valve in such timed relationship with respect to its associated fuel valve that, upon closure of the latter, said by-pass valve is opened and vice versa, means for operating both of said fuel valves in timed relationship with respect to each other, and means for changing the timed relationship of said fuel valves, whereby the period of fuel injection may be varied.

3. In a distributor for supplying liquid fuel under pressure to an internal combustion engine, the combination with a source of liquid fuel under pressure, of means defining a passage for the fuel from the source to the engine, first and second valves located in the passageway in series relation for controlling, respectively, the cut-off and admission of fuel to the engine, a valve associated with each fuel valve for by-passing fuel away from the passage, means for operating all of said valves in timed relationship with respect to the engine, said last-mentioned means being arranged to close the respective by-pass valves upon opening of their associated fuel valves and vice versa, and means for changing the timed relationship of the first fuel valve and its associated by-pass valve relative to the second fuel valve and its associated by-pass valve, whereby the period of fuel injection may be varied.

4. In a distributor for supplying liquid fuel under pressure to an internal combustion engine, the combination with a source of liquid fuel under pressure, of means defining a passage for the fuel from the source to the engine, first and second fuel valves located in the passage in series relationship for controlling, respectively, the cut-off and admission of fuel to the engine, a valve associated with the passage for by-passing fuel away from the engine, means for opening and closing the fuel valves in such timed relationship with respect to the engine and with respect to each other that a portion of their opening periods overlap and thus effect a period of fuel admission to the engine, means for operating the by-pass valve in such timed relation with respect to the engine and with respect to the fuel valves that said by-pass valve is closed during said fuel admission period, and means for varying said fuel admission period by altering the timed relationship of the fuel valves and the by-pass valve relative to each other and to the engine.

5. In a distributor for supplying liquid fuel under pressure to an internal combustion engine, the combination with a source of liquid fuel under pressure, of means defining a passage for the fuel from the source to the engine, first and second fuel valves located in the passage in series relationship for controlling, respectively, the cut-off and admission of fuel to the engine, a valve associated with each fuel valve for by-passing fuel away from the passage, means for operating all of said valves in timed relationship with respect to the engine, said last-mentioned means being arranged to close the respective by-pass valves coincident with the opening of their associated fuel valves and vice versa, and means for changing the timed relationship of the first fuel valve and its associated by-pass valve relative to the second fuel valve and its associated by-pass valve, whereby the period of fuel injection may be varied.

In testimony whereof, I have hereunto subscribed my name this 20th day of January, 1927.

ALEXANDER T. KASLEY.